United States Patent
Kim et al.

(10) Patent No.: US 8,642,197 B2
(45) Date of Patent: Feb. 4, 2014

(54) RECHARGEABLE BATTERY

(75) Inventors: In Kim, Yongin-si (KR); Duk-Jung Kim, Yongin-si (KR); Hyung-Sik Kim, Yongin-si (KR); Zin Park, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/564,577

(22) Filed: Aug. 1, 2012

(65) Prior Publication Data

US 2013/0101875 A1   Apr. 25, 2013

(30) Foreign Application Priority Data

Oct. 19, 2011   (KR) .................. 10-2011-0107016

(51) Int. Cl.
*H01M 2/00*   (2006.01)

(52) U.S. Cl.
USPC ............................................. 429/61

(58) Field of Classification Search
USPC ............... 429/163–187, 148–160, 61, 57–60
See application file for complete search history.

(56) References Cited

U.S. PATENT DOCUMENTS

| | | | |
|---|---|---|---|
| 2010/0129709 A1* | 5/2010 | Matsubara | 429/179 |
| 2010/0233528 A1* | 9/2010 | Kim et al. | 429/178 |
| 2011/0177387 A1* | 7/2011 | Byun et al. | 429/178 |
| 2011/0183165 A1* | 7/2011 | Byun et al. | 429/61 |
| 2011/0287311 A1* | 11/2011 | Kim et al. | 429/181 |
| 2012/0251851 A1* | 10/2012 | Kim et al. | 429/61 |
| 2012/0282502 A1* | 11/2012 | Kim | 429/82 |

FOREIGN PATENT DOCUMENTS

| | | | | |
|---|---|---|---|---|
| JP | 2000-208023 A | 7/2000 | | |
| JP | 2006-012602 A | 1/2006 | | |
| KR | 10-2010-0070495 | * 11/2011 | | H01M 2/02 |

* cited by examiner

*Primary Examiner* — Patrick Ryan
*Assistant Examiner* — Kiran Quraishi
(74) *Attorney, Agent, or Firm* — Christie, Parker & Hale, LLP (57) ABSTRACT

A rechargeable battery including an electrode assembly including a positive electrode and a negative electrode; a case containing the electrode assembly; a terminal electrically connected to the electrode assembly; a current collecting member fixed to the electrode assembly; and a connection member electrically connecting the electrode assembly and the terminal, and the connection member includes a first end fixed to one of the current collecting member or the terminal, a second end spaced apart from the first end and contacting the other of the current collecting member or the terminal, and a fuse portion between the first end and the second end, the fuse portion having a smaller cross-sectional area than a surrounding portion of the connection member.

16 Claims, 10 Drawing Sheets

RECHARGEABLE BATTERY

CROSS-REFERENCE TO RELATED APPLICATION

This application claims priority to and the benefit of Korean Patent Application No. 10-2011-01 07016 filed on Oct. 19, 2011 in the Korean Intellectual Property Office, the entire content of which is incorporated herein by reference.

BACKGROUND

1. Field

Aspects of embodiments of the present invention relate to a rechargeable battery, and more particularly, to a rechargeable battery in which a structure of a safety apparatus that is capable of decreasing a risk when an overcurrent occurs is improved.

2. Description of the Related Art

A rechargeable battery is a battery that can be charged and discharged, unlike a primary battery that is incapable of being charged. A rechargeable battery having low capacity is commonly used in a portable small electronic device, such as a mobile phone, a laptop computer, or a camcorder, and a battery having large capacity is widely used as a power source for driving a motor in an electric vehicle, a hybrid vehicle, or the like.

Recently, a high power rechargeable battery that uses a non-aqueous electrolyte having high energy density has been developed, and the high power rechargeable battery is constituted by a large-capacity rechargeable battery in which a plurality of rechargeable batteries are coupled in series in order to be used for driving devices requiring large power, such as motors for electric vehicles or hybrid vehicles, for example.

In addition, a large-capacity rechargeable battery generally includes a plurality of rechargeable batteries that are coupled in series, and the rechargeable battery may be formed in cylindrical and/or angular shapes.

If an overcurrent flows through the rechargeable battery having a case that is made of material such as metal, the temperature of the rechargeable battery may increase and increase a risk of ignition. In addition, if the internal pressure of the rechargeable battery increases because of decomposition of the electrolyte solution in the rechargeable battery due to the overcurrent, there is a risk of explosion of the rechargeable battery.

The above information disclosed in this Background section is only for enhancement of understanding of the background of the described technology, and therefore it may contain information that does not form the prior art that is already known in this country to a person of ordinary skill in the art.

SUMMARY

According to an aspect of embodiments of the present invention, a rechargeable battery has improved safety. Further, according to an aspect of embodiments of the present invention, in a rechargeable battery, a structure of a safety apparatus that is capable of decreasing a risk when an overcurrent occurs is improved. As such, a rechargeable battery according to embodiments of the present invention is particularly suited for application in an electric vehicle or a hybrid electric vehicle.

According to an exemplary embodiment of the present invention, a rechargeable battery includes: an electrode assembly including a positive electrode and a negative electrode; a case containing the electrode assembly; a terminal electrically connected to the electrode assembly; a current collecting member fixed to the electrode assembly; and a connection member electrically connecting the electrode assembly and the terminal, and the connection member includes a first end fixed to one of the current collecting member or the terminal, a second end spaced apart from the first end and contacting the other of the current collecting member or the terminal, and a fuse portion between the first end and the second end, the fuse portion having a smaller cross-sectional area than a surrounding portion of the connection member.

The rechargeable battery may further include a lower insulation member into which a lower portion of the terminal and an upper portion of the current collecting member are inserted, and a fuse groove may be formed on the lower insulation member, the fuse groove having a bottom surface spaced apart from the fuse portion and the second end of the connection member.

The terminal may include a flange portion, a terminal pillar protruding from the flange portion, and a first groove formed in the flange portion and receiving the first end of the connection member. The current collecting member may include an electrode combination portion fixed to the electrode assembly, and a terminal combination portion bent toward the terminal from the electrode combination portion, and the terminal combination portion may have a second groove receiving the second end of the connection member.

The lower insulation member may have a flange groove into which the flange portion is inserted, and a current collecting groove into which the terminal combination portion is inserted, and the fuse groove may be formed between the flange groove and the current collecting groove at a lower position than the flange groove.

The rechargeable battery may further include an insulative gasket between the cap plate and the terminal. The current collecting member may have a hole formed therein, and the gasket may include a protrusion inserted in the hole.

The rechargeable battery may further include a lower cover on an upper portion of the gasket and combined with the lower insulation member by being inserted therein, and the current collecting member may have a hole formed therein, and the lower cover may include a protrusion inserted in the hole.

The second end of the connection member may include a second connection plate, and a protrusion may be formed on the second connection plate. The protrusion may be formed by bending the second connection plate. The fuse portion may be configured to separate from the surrounding portion in an overcurrent condition and drop into the fuse groove.

In one embodiment, the connection member may be integrally formed with the terminal. In another embodiment, the connection member may be integrally formed with the current collecting member. The first end of the connection member may include a first connection plate fixed to the terminal, and the second end of the connection member may include a second connection plate contacting the current collecting member. The connection member may be elastically deformed against the other of the current collecting member or the terminal.

According to an aspect of embodiments of the present invention, when a short circuit occurs by overcurrent, a blocking member allows a fuse member to be in a short circuit state, thereby improving safety of a rechargeable battery.

BRIEF DESCRIPTION OF THE DRAWINGS

The accompanying drawings, together with the specification, illustrate some exemplary embodiments of the present

DESCRIPTION OF REFERENCE NUMERALS INDICATING SOME ELEMENTS IN THE DRAWINGS

| | |
|---|---|
| 101, 102, 103, 104, 105: Rechargeable battery | |
| 10: Electrode assembly | |
| 11: Positive electrode | 11a: Positive electrode uncoated region |
| 12: Negative electrode | 12a: Negative electrode uncoated region |
| 13: Separator | 21, 121: Positive electrode terminal |
| 22: Negative electrode terminal | 21a, 22a, 121a: Terminal pillar |
| 21b, 22b, 121b: Terminal flange | 21c: First groove |
| 23, 24: Washer | 25, 27: First gasket |
| 26, 28: Second gasket | 26a: Plate portion |
| 26b: Upper insulation portion | 26c, 84, 92a: Protrusion |
| 29: Nut | 30: Cap assembly |
| 31: Cap plate | 35: Short-circuit hole |
| 37: Electrolyte injection opening | 38: Sealing stopper |
| 39: Vent member | 40: Case |
| 41, 42: Current collecting member | 61, 62: Lower insulation member |
| 70, 80: Connection member | 71, 81: First connection plate |
| 72, 82: Second connection plate | 73, 83: Fuse portion |
| 91: Second gasket | 92: Lower cover |

DETAILED DESCRIPTION

In the following detailed description, some exemplary embodiments of the present invention are shown and described, by way of illustration. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
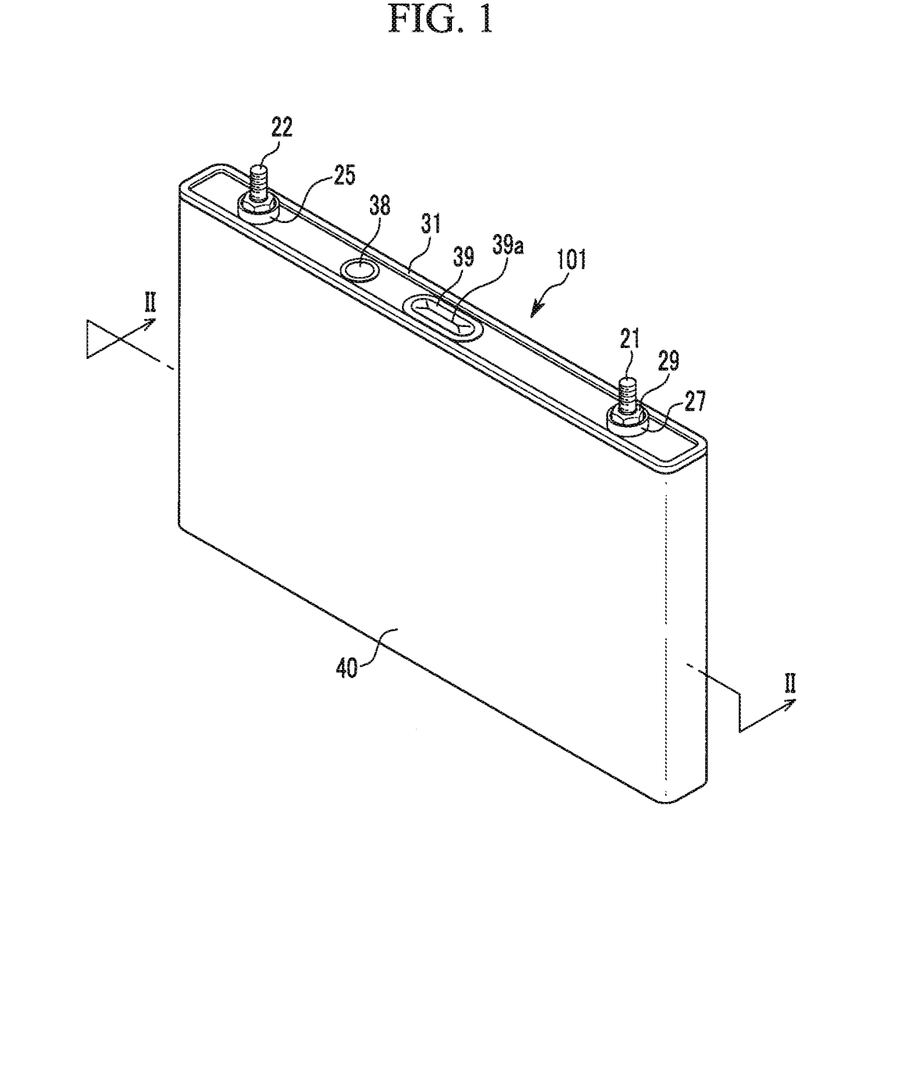
FIG. 1 is a perspective view of a rechargeable battery according to an exemplary embodiment of the present invention.
Figure 2:
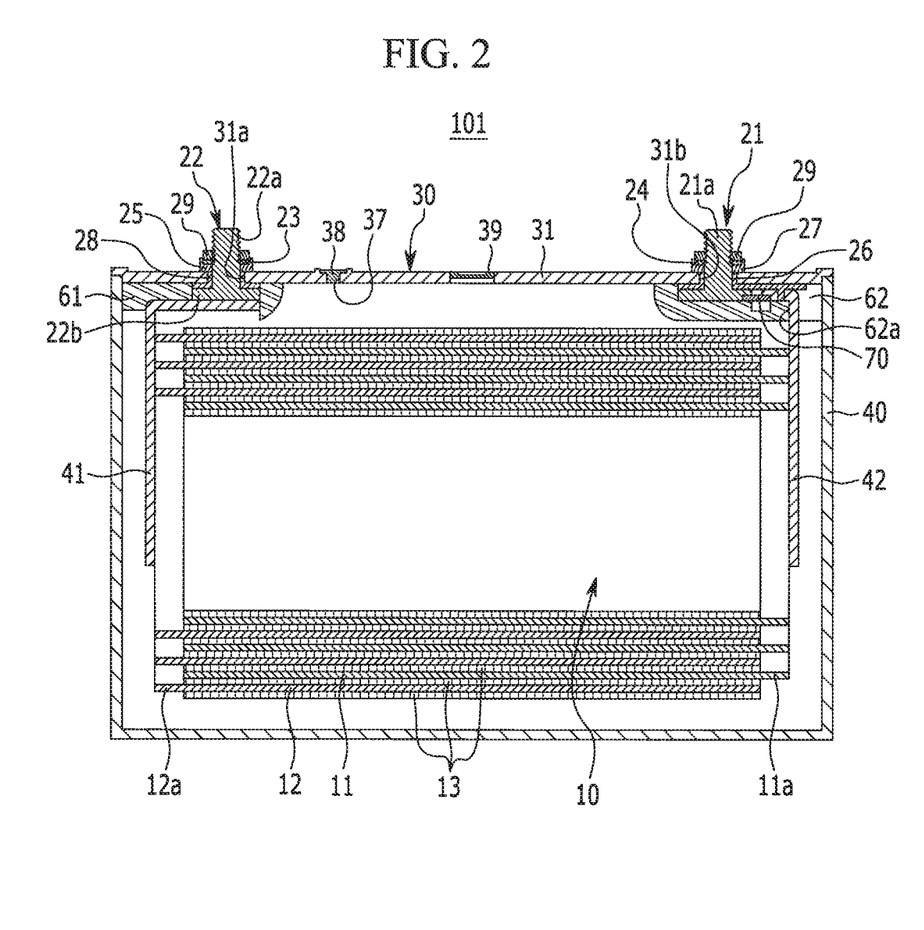
FIG. 2 is a cross-sectional view of the rechargeable battery of FIG. 1, taken along the line

FIG. 1 is a perspective view of a rechargeable battery according to an exemplary embodiment of the present invention, and FIG. 2 is a cross-sectional view of the rechargeable battery of FIG. 1, taken along the line II-II.

Referring to FIG. 1 and FIG. 2, a rechargeable battery 101 according to an exemplary embodiment of the present invention includes an electrode assembly 10 that is wound with a separator 13 interposed between a positive electrode 11 and a negative electrode 12, a case 40 in which the electrode assembly 10 is housed, and a cap assembly 30 sealing an opening of the case 40.

The rechargeable battery 101 is described and shown having an angular shape as a lithium ion rechargeable battery. However, the present invention is not limited thereto, and a rechargeable battery according to embodiments of the present invention may be of another of various shapes or types of batteries, such as a lithium polymer battery or a cylindrical battery.

In one embodiment, the positive electrode 11 and the negative electrode 12 include a coating region that is a region on which an active material is coated on a current collector formed of a metal foil or a thin plate, and uncoated regions 11a and 12a that are regions on which the active material is not coated.

The positive electrode uncoated region 11a is formed at a side end of one side of the positive electrode 11 along a lengthwise direction of the positive electrode 11, and the negative electrode uncoated region 12a is formed at a side end of another side of the negative electrode 12 along a lengthwise direction of the negative electrode 12. In one embodiment, the positive electrode 11 and negative electrode 12 are wound after a separator 13 that is an insulator is interposed therebetween.

However, the present invention is not limited thereto, and the electrode assembly 10 may have a structure in which a positive electrode and a negative electrode including a plurality of sheets are laminated with an insulator interposed therebetween.

The case 40, in one embodiment, is formed having a generally cuboid shape, and an opening is formed on a side thereof. The cap assembly 30 includes a cap plate 31 that covers the opening of the case 40, a positive electrode terminal 21 that protrudes to an external portion of the cap plate 31 and is electrically connected to the positive electrode 11, a negative terminal 22 that protrudes to the external portion of the cap plate 31 and is electrically connected to the negative electrode 12, and a vent member 39 in which a notch 39a is formed such that the vent member 39 is broken according to an internal pressure (e.g., at a predetermined internal pressure).

The cap plate 31, in one embodiment, is formed of a thin plate having an electrolyte injection opening 37 for injecting an electrolyte solution formed at one side, and a sealing stopper 38 that seals the electrolyte injection opening 37 is fixed to the cap plate 31.

In one embodiment, the negative electrode terminal 22 is installed penetrating through the cap plate 31, and between the cap plate 31 and the negative electrode terminal 22, a first gasket 25 disposed at an upper portion and a second gasket 28 disposed at a lower portion insulate the cap plate 31 and the negative electrode terminal 22 from each other.

The negative electrode terminal 22, in one embodiment, is formed in a cylindrical shape, a nut 29 that supports the negative electrode terminal 22 at the upper portion thereof is installed on the negative electrode terminal 22, and a screw thread is formed on an external circumference of a terminal pillar 22a of the negative electrode terminal 22 such that the nut 29 may be fastened thereto. A washer 23 may be installed between the nut 29 and the first gasket 25.

In one embodiment, a terminal flange 22b is formed at the lower portion of the negative electrode terminal 22 to support the negative electrode terminal 22 at the lower portion thereof. In one embodiment, the terminal flange 22b and a current collecting member 41 are inserted into a groove formed on a lower insulation member 61 that is disposed under the cap plate 31. The lower insulation member 61 serves to insulate the current collecting member 41 and the negative electrode terminal 22 from the cap plate 31.

The positive electrode terminal 21 is installed penetrating through the cap plate 31, and between the cap plate 31 and the positive electrode terminal 21, a first gasket 27 disposed at an upper portion and a second gasket 26 disposed at a lower portion insulate the cap plate 31 and the positive electrode terminal 21 from each other.

The positive electrode terminal 21, in one embodiment, is formed having a cylindrical shape, a nut 29 that supports the positive electrode terminal 21 at the upper portion thereof is installed on the positive electrode terminal 21, and a screw thread is formed on an external circumference of the positive electrode terminal 21 such that the nut 29 may be fastened thereto. A washer 24 may be installed between the nut 29 and the first gasket 27.

Figure 3:
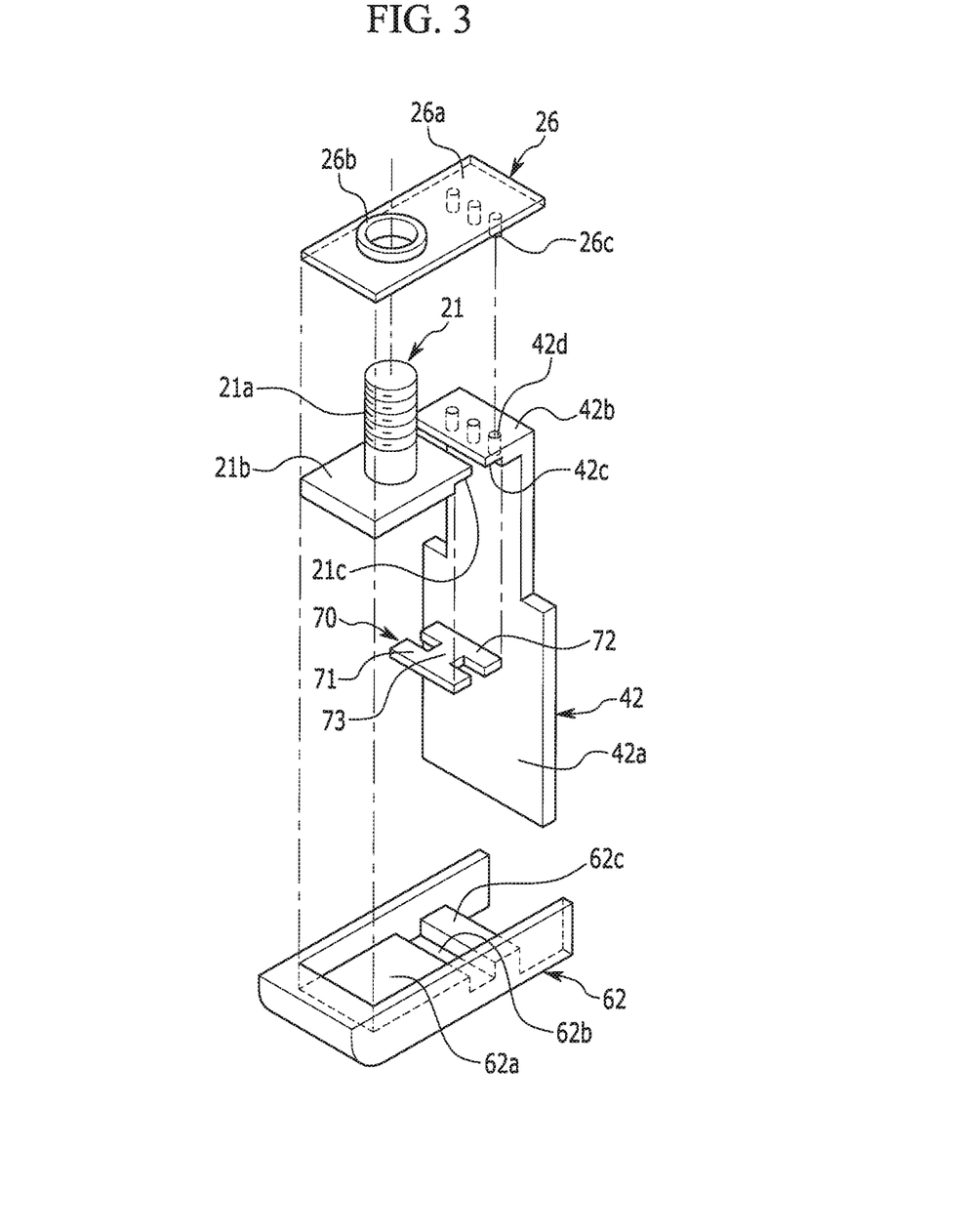
FIG. 3 is an exploded perspective view of a portion of the rechargeable battery of FIG. 1.
Figure 4:
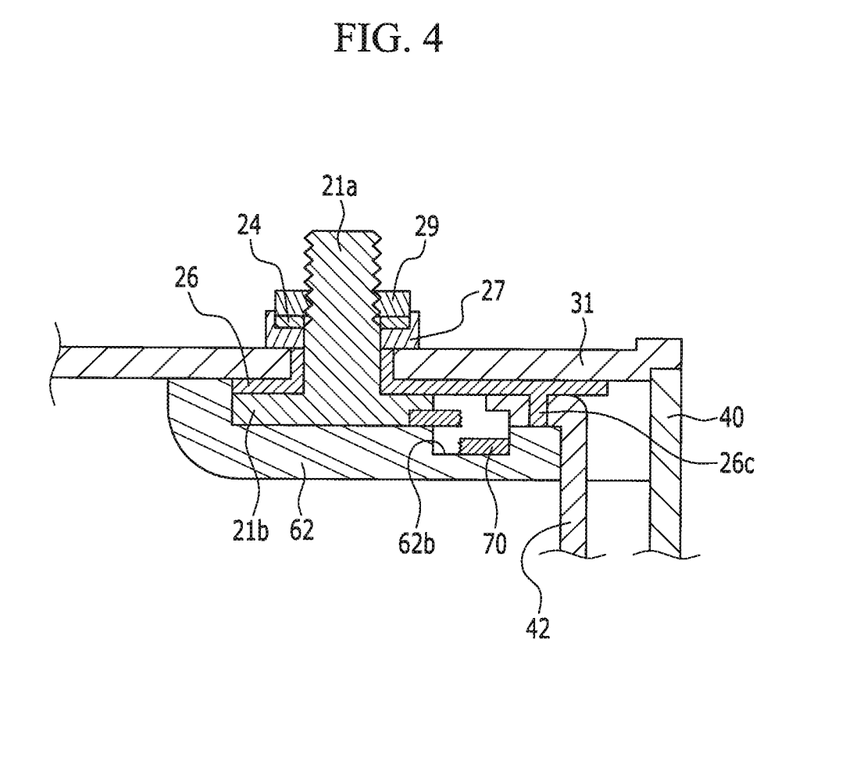
FIG. 4 is a cross-sectional view of a portion of the rechargeable battery of FIG. 1.

FIG. 3 is an exploded perspective view of a portion of the rechargeable battery 101, and FIG. 4 is a cross-sectional view of a portion of the rechargeable battery 101.

The positive electrode terminal 21, in one embodiment, includes a terminal flange 21b, a terminal pillar 21a that protrudes from the terminal flange 21b and has an external circumferential surface having the screw thread formed, and a first groove 21c formed on a bottom side of the terminal flange 21b.

The second gasket 26, in one embodiment, is installed to cover the terminal flange 21b, and has a plate portion 26a covering the terminal flange 21b, an upper insulation portion 26b into which the terminal pillar 21a is inserted and which surrounds the terminal pillar 21a, and a plurality of protrusions 26c that protrude from a lower surface of the plate portion 26a and are inserted into corresponding holes 42d formed in a current collecting member 42. The second gasket 26, in one embodiment, is formed of an electrically insulative polymer material.

The positive electrode terminal 21 is electrically connected to the positive electrode 11 through the current collecting member 42. The current collecting member 42, in one embodiment, includes an electrode combination portion 42a that is attached to the electrode assembly 10 (e.g., by welding), and a terminal combination portion 42b that is bent toward the positive electrode terminal 21 at an upper end of the electrode combination portion 42a. A second groove 42c is formed on a lower surface of the terminal combination portion 42b, and the holes 42d into which the protrusions 26c are inserted are formed on the terminal combination portion 42b.

Between the current collecting member 42 and the positive electrode terminal 21, a connection member 70 on which a fuse portion 73 is formed is installed. The connection member 70 includes a first connection plate 71 inserted into the first groove 21c, a second connection plate 72 inserted into the second groove 42c, and the fuse portion 73 that is formed between the first connection plate 71 and the second connection plate 72 and has a smaller cross-sectional area than surrounding portions (i.e. the first and second connection plates 71 and 72). In one embodiment, the fuse portion 73 is formed to have a smaller width than the first connection plate 71 and the second connection plate 72 to have a smaller cross-sectional area than surrounding portions.

The first connection plate 71, in one embodiment, is a fixed end by being fixed to the positive electrode terminal 21 (e.g., by welding), and the second connection plate 72 is contacted with the current collecting member 42 in a free end state. In one embodiment, an upper surface of the second connection plate 72 is formed higher than the second groove 42c, and the second connection plate 72 is installed such that the second groove 42c presses down on the second connection plate 72 (e.g., in an elastically deformed state). Accordingly, contact resistance between the current collecting member 42 and the connection member 70 may be minimized or reduced.

A lower insulation member 62 is installed under the positive electrode terminal 21 and, in one embodiment, includes a terminal groove 62a into which the terminal flange 21b is inserted, a current collecting groove 62c which is spaced apart from the terminal groove 62a and into which the current collecting member 42 is inserted, and a fuse groove 62b that is formed between the terminal groove 62a and the current collecting groove 62c and is formed having a depth lower than the terminal groove 62a.

The terminal groove 62a supports the terminal flange 21b that is inserted therein, and the first connection plate 71 is inserted and fixed between the terminal groove 62a and the first groove 21c. The current collecting groove 62c supports the terminal combination portion 42b by inserting the terminal combination portion 42b therein.

The second connection plate 72 and the fuse portion 73 are disposed over the fuse groove 62b and spaced apart from the bottom of the fuse groove 62b, and a space in which the fuse portion 73 and the second connection plate 72 may be received is formed under the fuse portion 73 and the second connection plate 72. Accordingly, the second connection plate 72 is formed in a free end form, which does not have a structure that is supported at the lower portion thereof.

As shown in FIG. 4, if an overcurrent flows due to a short circuit, the fuse portion 73 is melted, and a portion of the melted fuse portion 73 and the second connection plate 72 fall into the fuse groove 62b. Accordingly, after the fuse portion 73 is melted, a spark is prevented or substantially prevented from occurring between the melted portions at a cut portion because a space between the melted portions is not narrow, and the fuse portion 73 is prevented or substantially prevented from becoming reconnected by external vibration. If a spark were to occur, a rechargeable battery could be ignited or exploded due to a flame. However, in the rechargeable battery 101 according to the present invention, when the fuse portion 73 is operated, the melted portion of the fuse portion 73 and the second connection plate 72 fall into the fuse groove 62b and the space between the melted portions is not narrow, such that reconnection of the fuse portion 73 or a spark between the melted portions is prevented or substantially prevented. As such, the rechargeable battery 101 is particularly suited for application in an electric vehicle or a hybrid electric vehicle.

In addition, if a melted fuse portion at a high temperature were to fall into an electrolyte solution, the electrolyte solution could be ignited. However, according to embodiments of the present invention, the melted fuse portion 73 falls into the fuse groove 62b, and contact between the fuse portion 73 at a high temperature and the electrolyte solution is prevented or substantially prevented.

Figure 5:
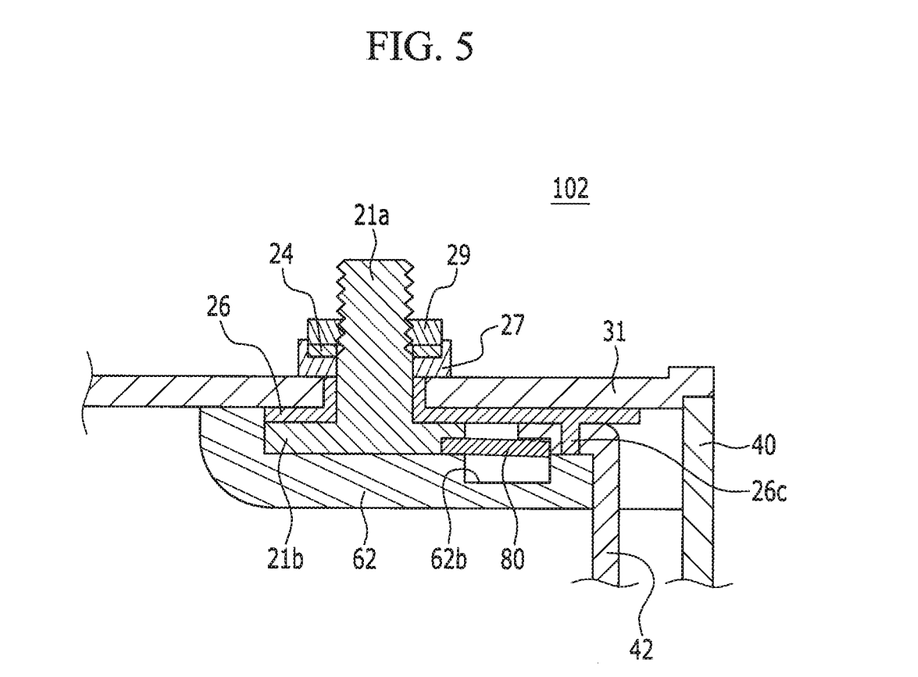
FIG. 5 is a cross-sectional view of a portion of a rechargeable battery according to another exemplary embodiment of the present invention.
Figure 6:
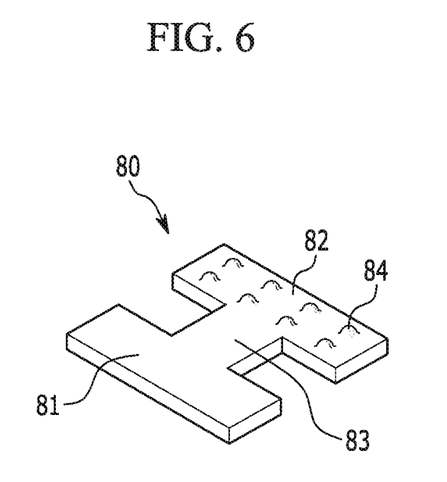
FIG. 6 is a perspective view of a connection member of the rechargeable battery of FIG. 5.

FIG. 5 is a cross-sectional view of a portion of a rechargeable battery according to another exemplary embodiment of the present invention, and FIG. 6 is a perspective view of a connection member of the rechargeable battery of FIG. 5.

Referring to FIG. 5 and FIG. 6, a rechargeable battery 102 according to another exemplary embodiment of the present invention has a same or substantially same structure as the rechargeable battery 101 described above, except for a structure of a connection member 80, and further description of the same structures is therefore omitted.

The connection member 80 according to one embodiment includes a first connection plate 81 that is inserted into the first groove 21c formed on the terminal flange 21b, a second connection plate 82 that is inserted into the second groove 42c formed on the current collecting member 42, and a fuse portion 83 that is formed between the first connection plate 81 and the second connection plate 82 and has a smaller cross-sectional area than surrounding portions (i.e. the first and second connection plates 81 and 82). The fuse portion 83, in one embodiment, is formed to have a smaller width than the first connection plate 81 and the second connection plate 82 to have a smaller cross-sectional area than surrounding portions.

In one embodiment, the first connection plate 81 is a fixed end by being fixed to the positive electrode terminal 21 (e.g., by welding), and the second connection plate 82 is contacted with the current collecting member 42 in a free end state. A plurality of protrusions 84 are formed on an upper surface of the second connection plate 82, and the protrusions 84 contact the current collecting member 42. The upper surfaces of the protrusions 84 are formed higher than the second groove 42c, and the second groove 42c presses down on the second connection plate 82, such that the connection member 80 is contacted with the current collecting member 42 in an elastically deformed state. Accordingly, contact resistance between the current collecting member 42 and the connection member 80 may be minimized or reduced.

Figure 7:
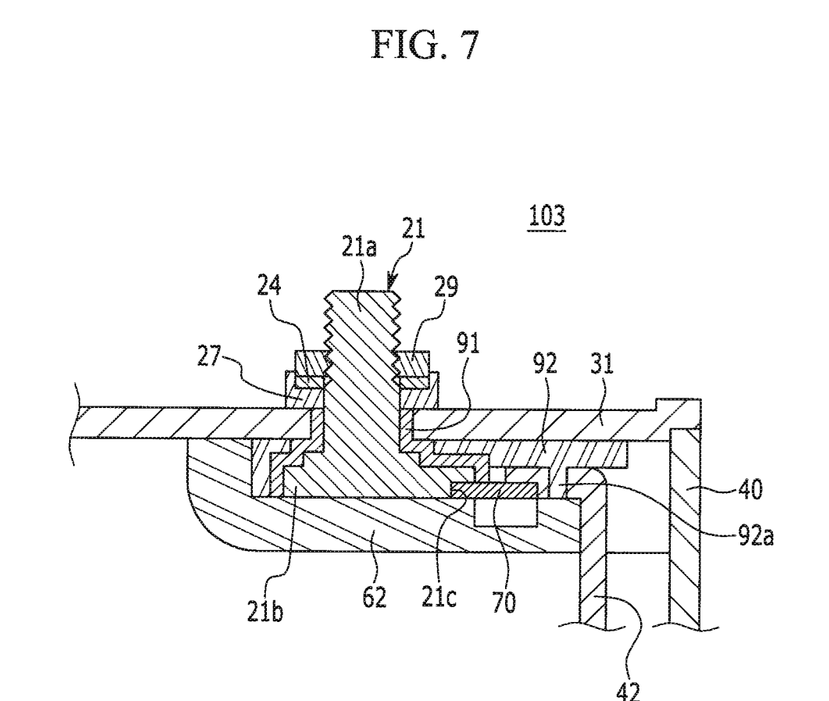
FIG. 7 is a cross-sectional view of a portion of a rechargeable battery according to another exemplary embodiment of the present invention.

FIG. 7 is a cross-sectional view of a portion of a rechargeable battery according to another exemplary embodiment of the present invention.

Referring to FIG. 7, a rechargeable battery 103 according to another exemplary embodiment of the present invention has a same or substantially same structure as the rechargeable battery 101 described above, except for a structure of an insulative second gasket 91 and an insulative lower cover 92, and further description of the same structures is therefore omitted.

The positive electrode terminal 21 includes the terminal pillar 21a protruding from the terminal flange 21b, the terminal pillar 21a having an external circumferential surface having a screw thread, and the first groove 21c is formed on the bottom of one side of the terminal flange 21b.

The second gasket 91 is installed to cover the terminal flange 21b, and the lower cover 92 covering the second gasket 91 is installed on the second gasket 91. The lower cover 92 is installed to cover the second gasket 91, and is combined with a groove formed on the lower insulation member 62 by being inserted therein.

In addition, a protrusion 92a inserted into the hole 42c formed on the current collecting member 42 is formed on the lower cover 92. Accordingly, the current collecting member 42 may be stably supported by the protrusion 92a between the lower cover 92 and the lower insulation member 62.

Figure 8:
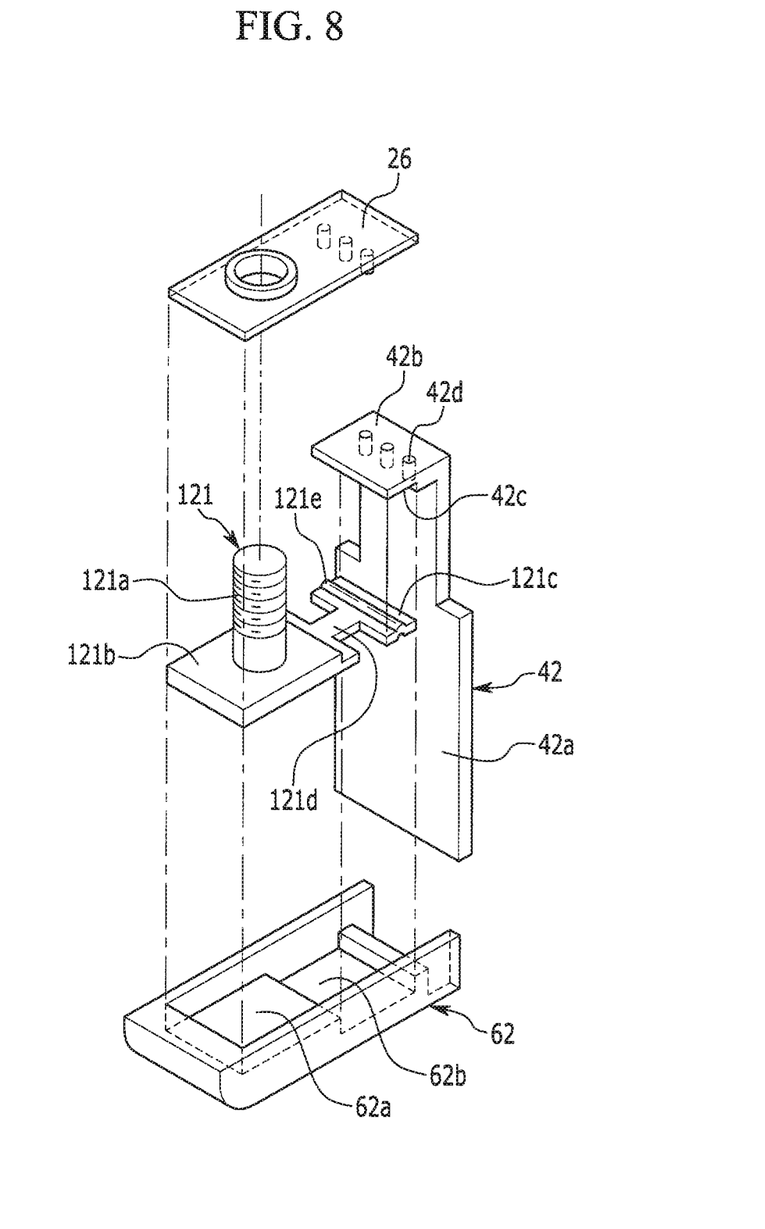
FIG. 8 is an exploded perspective view of a portion of a rechargeable battery according to another exemplary embodiment of the present invention.
Figure 9:
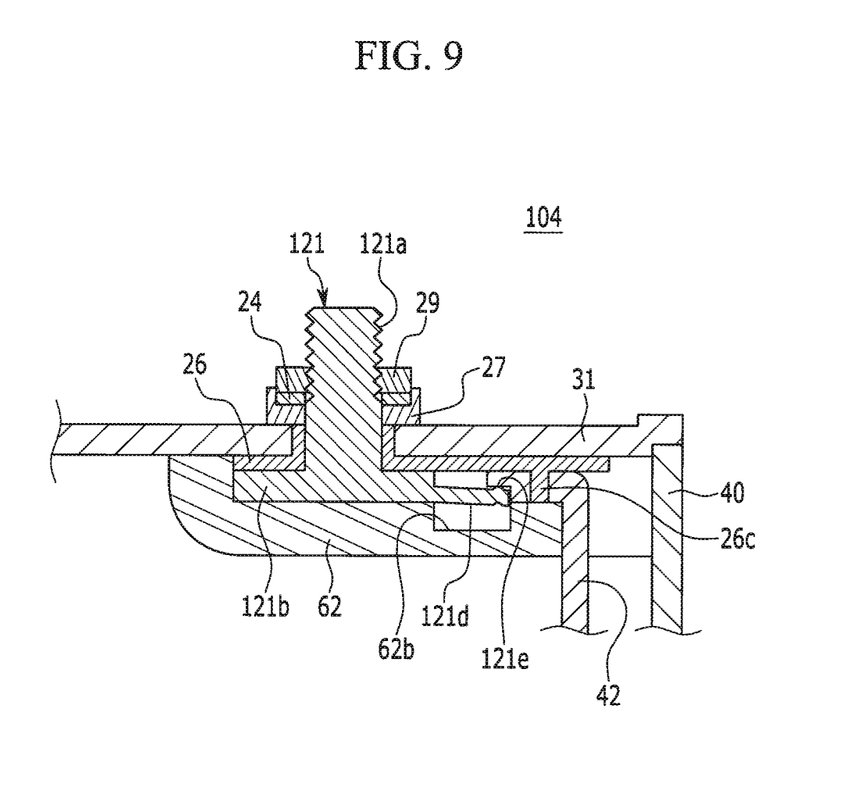
FIG. 9 is a cross-sectional view of a portion of the rechargeable battery of FIG. 8, shown in an assembled state.

FIG. 8 is an exploded perspective view of a portion of a rechargeable battery according to another exemplary embodiment of the present invention, and FIG. 9 is a cross-sectional view of a portion of the rechargeable battery of FIG. 8, shown in an assembled state.

Referring to FIG. 8 and FIG. 9, a rechargeable battery 104 according to another exemplary embodiment of the present invention has a same or substantially same structure as the rechargeable battery 101 described above, except for a structure of a positive electrode terminal 121 and a connection portion 121c, and further description of the same structures is therefore omitted.

The positive electrode terminal 121 includes a terminal pillar 121a protruding at a terminal flange 121b and having an external circumferential surface having a screw thread, the terminal pillar 121a extending from an end of one side of the terminal flange 121b. The positive electrode terminal 121 further includes a connection portion 121c that is electrically contacted with the current collecting member 42, and a fuse portion 121d formed between the connection portion 121c and the terminal flange 121b.

The connection portion 121c, in one embodiment, is formed as a plate that is inserted into the second groove 42c formed on the current collecting member 42. In one embodiment, a protrusion 121e bent and protruding is formed on the connection portion 121c, such that the protrusion 121e presses against the current collecting member 42 and is contacted therewith. In one embodiment, the protrusion 121e is pressed and is elastically deformed to be contacted with the current collecting member 42. Accordingly, contact resistance between the connection portion 121c and the current collecting member 42 may be minimized or reduced.

The fuse portion 121d has a smaller cross-sectional area than surrounding portions, and when an overcurrent flows, the fuse portion is melted to cut electrical connection between the positive electrode terminal 121 and the current collecting member 42.

In the rechargeable battery 104, the fuse portion 121d and the connection portion 121c are formed on the positive electrode terminal 121 and, therefore, it is not necessary to install a separate connection member, and the contact resistance may be minimized or reduced. That is, the fuse portion 121d and the connection portion 121c are a connection member that is formed on (e.g., integrally formed with) the positive electrode terminal 121. In addition, if the fuse portion 121d is melted, the fuse portion 121d falls into the fuse groove 62b formed on the lower insulation member 62, such that reconnection of the melted portion or an occurrence of a spark is prevented or substantially prevented.

Figure 10:
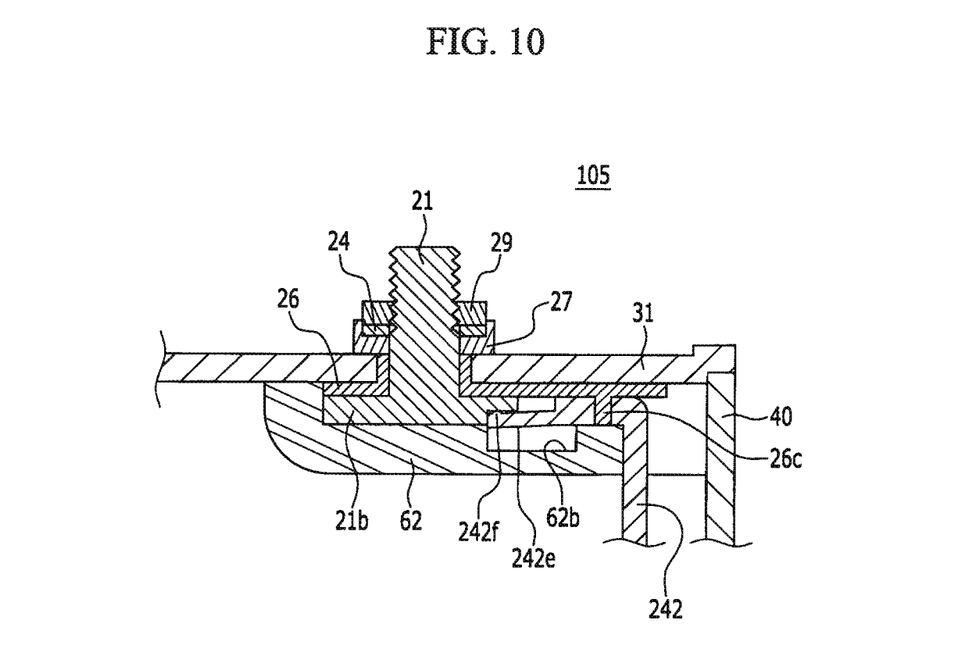
FIG. 10 is a cross-sectional view of a portion of a rechargeable battery according to another exemplary embodiment of the present invention.
Figure 11:
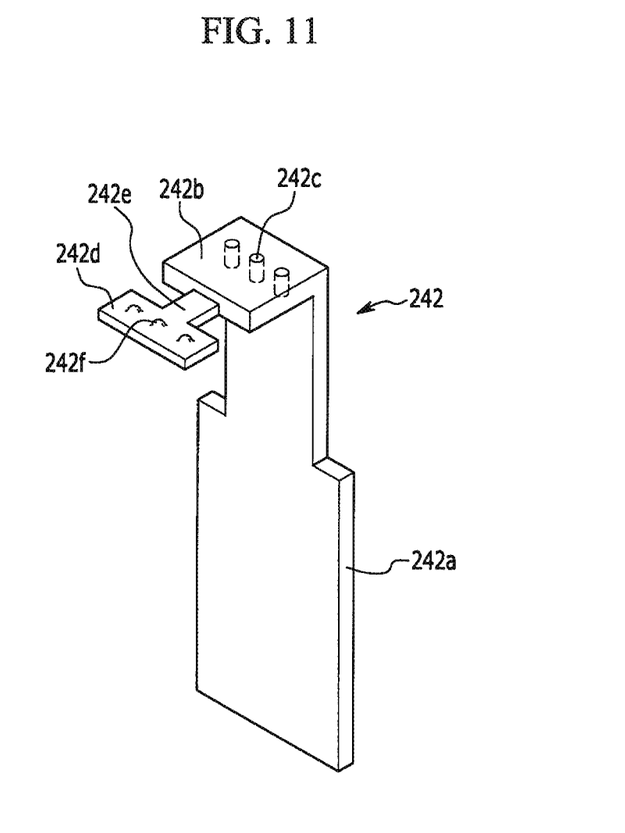
FIG. 11 is a perspective view of a current collecting member of the rechargeable battery of FIG. 10.

FIG. 10 is a cross-sectional view of a portion of a rechargeable battery according to another exemplary embodiment of the present invention, and FIG. 11 is a perspective view of a current collecting member of the rechargeable battery of FIG. 10.

Referring to FIG. 10 and FIG. 11, a rechargeable battery 105 according to another exemplary embodiment of the present invention has a same or substantially same structure as the rechargeable battery 101 described above, except for a structure of a current collecting member 242, and further description of the same structures is therefore omitted.

The current collecting member 242 includes an electrode combination portion 242a that is attached to the electrode assembly 10 (e.g., by welding), a terminal combination portion 242b that is formed by being bent toward the positive electrode terminal 21 at the electrode combination portion 242a, one or more holes 242c formed in the terminal combination portion 242b, a connection portion 242d that is electrically contacted with the positive electrode terminal 21, and a fuse portion 242e that is formed between the connection portion 242d and the terminal combination portion 242b.

The connection portion 242d, in one embodiment, is formed having a plate form and is inserted into the first groove 21c formed on the terminal flange 21b. A protruding protrusion 242f is formed on the connection portion 242d, and the protrusion 242f is pressed against the terminal flange 242b and is contacted therewith.

The fuse portion 242e is formed to have a smaller cross-sectional area than surrounding portions, and when an overcurrent flows, the fuse portion is melted to cut electrical connection between the positive electrode terminal 21 and the current collecting member 242.

In the rechargeable battery 105, according to an exemplary embodiment, the fuse portion 242e and the connection portion 242d are formed on the current collecting member 242, such that a separate connection member is not needed, and a contact resistance may be minimized or reduced. That is, the fuse portion 242e and the connection portion 242d are a connection member that is formed on (e.g., integrally formed with) the current collecting member 242. In addition, if the fuse portion 242e is melted, the fuse portion 242e and the connection portion 242d fall into the fuse groove 62b formed on the lower insulation member 62, such that reconnection of the melted portion or an occurrence of a spark is prevented or substantially prevented.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
    an electrode assembly comprising a positive electrode and a negative electrode;
    a case containing the electrode assembly;
    a terminal electrically connected to the electrode assembly;
    a current collecting member fixed to the electrode assembly;
    a connection member electrically connecting the electrode assembly and the terminal; and
    a lower insulation member into which a lower portion of the terminal and an upper portion of the current collecting member are inserted,
    wherein the connection member comprises a first end fixed to one of the current collecting member or the terminal, a second end spaced apart from the first end and contacting the other of the current collecting member or the terminal in a free end state over a fuse groove formed on an upper surface of the lower insulation member, and a fuse portion between the first end and the second end, the fuse portion having a smaller cross-sectional area than a surrounding portion of the connection member, and
    wherein the lower insulation member is between the fuse portion and the electrode assembly.

2. The rechargeable battery of claim 1, wherein the fuse groove has a bottom surface spaced apart from the fuse portion and the second end of the connection member.

3. The rechargeable battery of claim 2, wherein the terminal includes a flange portion, a terminal pillar protruding from the flange portion, and a first groove formed in the flange portion and receiving the first end of the connection member.

4. The rechargeable battery of claim 3, wherein the current collecting member comprises an electrode combination portion fixed to the electrode assembly, and a terminal combination portion bent toward the terminal from the electrode combination portion, wherein the terminal combination portion has a second groove receiving the second end of the connection member.

5. The rechargeable battery of claim 3,
    wherein the lower insulation member has a flange groove into which the flange portion is inserted, and a current collecting groove into which a terminal combination portion of the current collecting member is inserted, and
    wherein the fuse groove is formed between the flange groove and the current collecting groove at a lower position than the flange groove.

6. The rechargeable battery of claim 2, further comprising an insulative gasket between the cap plate and the terminal.

7. The rechargeable battery of claim 6, wherein the current collecting member has a hole formed therein, and the gasket comprises a protrusion inserted in the hole.

8. The rechargeable battery of claim 6, further comprising a lower cover on an upper portion of the gasket and combined with the lower insulation member by being inserted therein, wherein the current collecting member has a hole formed therein, and the lower cover comprises a protrusion inserted in the hole.

9. The rechargeable battery of claim 6, wherein the second end of the connection member comprises a second connection plate, and a protrusion is formed on the second connection plate.

10. The rechargeable battery of claim 9, wherein the protrusion is formed by bending the second connection plate.

11. The rechargeable battery of claim 2, wherein the fuse portion is configured to separate from the surrounding portion in an overcurrent condition and drop into the fuse groove.

12. The rechargeable battery of claim 1, wherein the connection member is integrally formed with the terminal.

13. The rechargeable battery of claim 1, wherein the connection member is integrally formed with the current collecting member.

14. The rechargeable battery of claim 1, wherein the first end of the connection member comprises a first connection plate fixed to the terminal, and the second end of the connection member comprises a second connection plate contacting the current collecting member.

15. The rechargeable battery of claim 1, wherein the connection member is elastically deformed against the other of the current collecting member or the terminal.

16. The rechargeable battery of claim 1, wherein the rechargeable battery is adapted for use as a motor-driving power source for propelling an electric vehicle or a hybrid electric vehicle.

* * * * *